(12) United States Patent
Gomez Minano et al.

(10) Patent No.: US 11,283,965 B2
(45) Date of Patent: Mar. 22, 2022

(54) PRINT CALIBRATION SYSTEM AND METHOD

(71) Applicant: Hewlett-Packard Development Company, L.P., Spring, TX (US)

(72) Inventors: Hector Gomez Minano, Sant Cugat del Valles (ES); Peter Morovic, Sant Cugat del Valles (ES); Jan Morovic, London (GB); Sergio Etchebehere Juan, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/311,041

(22) PCT Filed: Dec. 14, 2018

(86) PCT No.: PCT/US2018/065735
§ 371 (c)(1),
(2) Date: Jun. 4, 2021

(87) PCT Pub. No.: WO2020/122942
PCT Pub. Date: Jun. 18, 2020

(65) Prior Publication Data
US 2022/0030135 A1  Jan. 27, 2022

(51) Int. Cl.
*H04N 1/60*  (2006.01)

(52) U.S. Cl.
CPC ......... *H04N 1/6025* (2013.01); *H04N 1/6027* (2013.01)

(58) Field of Classification Search
CPC .................... H04N 1/6025; H04N 1/6027
See application file for complete search history.

(56) References Cited

U.S. PATENT DOCUMENTS

| 7,190,487 | B2 * | 3/2007 | Dalrymple | ............. G06K 15/02 |
| | | | | 345/601 |
| 7,460,283 | B2 * | 12/2008 | Saito | ........................ H04N 1/54 |
| | | | | 358/3.23 |

(Continued)

FOREIGN PATENT DOCUMENTS

| CN | 105191276 | 12/2015 | |
| WO | WO-2014173474 A1 * | 10/2014 | ......... H04N 1/00954 |

*Primary Examiner* — Ted W Barnes
(74) *Attorney, Agent, or Firm* — HP Inc. Patent Department (57) ABSTRACT

A print calibration system comprising a printing device to apply print material to a print target in a printing process, a memory for storing a lookup table; and a processor. The processor causes the printing device to print calibration points for reproducing a color ramp, by receiving a plurality of Neugebauer Primary area coverage ('NPac') points representing the plurality of calibration points and determining a hue angle and color space based on the NPac points. A plurality of nodes distributed between a first node and a second node of a sectional representation of the NPac points is determined. A lookup table is generated based on a relationship between the plurality of nodes and the NPac points for use during the printing process, wherein the lookup table comprises values to map between a first color space and a second color space, the lookup table is then provided to the printing device.

13 Claims, 6 Drawing Sheets

(56) References Cited

U.S. PATENT DOCUMENTS

| | | | |
|---|---|---|---|
| 7,710,597 B2* | 5/2010 | Edge | H04N 1/6011 358/1.9 |
| 9,501,727 B2* | 11/2016 | Morovic | H04N 1/4072 |
| 2009/0002737 A1* | 1/2009 | Kuno | H04N 1/6058 358/1.9 |
| 2009/0310154 A1* | 12/2009 | Morovic | H04N 1/54 358/1.9 |
| 2010/0214576 A1* | 8/2010 | Morovic | H04N 1/6016 358/1.9 |
| 2011/0063632 A1 | 3/2011 | Klassen et al. | |
| 2011/0096344 A1* | 4/2011 | Morovic | H04N 1/6033 358/1.9 |
| 2011/0096345 A1* | 4/2011 | Benedicto | H04N 1/6058 358/1.9 |
| 2011/0096364 A1* | 4/2011 | Morovic | H04N 1/6058 358/3.06 |
| 2011/0096365 A1* | 4/2011 | Benedicto | H04N 1/6058 358/3.06 |
| 2014/0016143 A1* | 1/2014 | Morovic | H04N 1/6016 358/1.9 |
| 2015/0324996 A1* | 11/2015 | Rius Rossell | H04N 1/6027 358/3.06 |
| 2016/0032120 A1* | 2/2016 | Morovic | C09D 11/50 347/100 |
| 2016/0034795 A1* | 2/2016 | Morovic | G06K 15/1878 358/1.9 |
| 2016/0057314 A1* | 2/2016 | Morovic | H04N 1/00954 358/3.23 |
| 2016/0080608 A1* | 3/2016 | Morovic | H04N 1/00015 358/3.23 |
| 2016/0155032 A1* | 6/2016 | Morovic | G06K 15/027 358/504 |
| 2016/0182763 A1* | 6/2016 | Morovic | H04N 1/6019 358/3.06 |
| 2017/0041506 A1* | 2/2017 | Morovic | H04N 1/6025 |
| 2017/0048420 A1* | 2/2017 | Morovic | H04N 1/6008 |
| 2017/0213102 A1* | 7/2017 | Morovic | H04N 1/6008 |
| 2017/0324884 A1* | 11/2017 | Morovic | G06F 17/18 |

* cited by examiner

PRINT CALIBRATION SYSTEM AND METHOD

BACKGROUND

A printing system may include different printing fluids or colorants. By overprinting images with each of the printing fluids or colorants, an image with a range of different colors can be printed. An example printing pipeline may comprise instructions for printing color such that they are similar to or match desired colors, such as those in a digital format. Printing instructions may be provided based on values in an input color space. Associations between the input color values and the print color space can be indicted to aid in printing according to printing instructions. Determining accurate color associations in a printing system often involves an expert in the field determining what combinations of printing fluids or colorants produce the desired result.

BRIEF DESCRIPTION OF THE DRAWINGS

Various features of the present disclosure will be apparent from the detailed description which follows, taken in conjunction with the accompanying drawings, which together illustrate features of the present disclosure, and wherein.

DETAILED DESCRIPTION

Color can be represented within imaging devices such as print and display devices in a variety of ways. For example, in one case, a color as observed visually by an observer is defined with reference to a power or intensity spectrum of electromagnetic radiation across a range of visible wavelengths. In other cases, a color model is used to represent a color at a lower dimensionality. For example, certain color models make use of the fact that color may be seen as a subjective phenomenon, i.e. dependent on the make-up of the human eye and brain. In this case, a "color" may be defined as a category that is used to denote similar visual perceptions; two colors are said to be similar if they produce a similar effect on a group of one or more people. These categories can then be modelled using a lower number of variables.

Within this context, a color model may define a color space. A color space in this sense may be defined as a multi-dimensional space, with a point in the multi-dimensional space representing a color value and dimensions of the space representing variables within the color model. For example, in a Red, Green, Blue (RGB) color space, an additive color model defines three variables representing different quantities of red, green and blue light. In a digital model, values for these quantities may be defined with reference to a quantized set of values. For example, a color defined using an 8-bit RGB model may have three values stored in a memory, wherein each variable may be assigned a value between 0 and 255. Other color spaces include: a Cyan, Magenta, Yellow and Black (CMYK) color space, in which four variables are used in a subtractive color model to represent different quantities of colorant or printing fluid, e.g. for a printing system; the International Commission on Illumination (CIE) 1931 XYZ color space, in which three variables (X, Y and Z or tristimulus values) are used to model a color; the CIE 1976 (L*, a*, b*—CIELAB or 'LAB') color space, in which three variables represent lightness (L*) and opposing color dimensions (a* and b*); the Yu'v' color space, in which three variables represent the luminance (Y) and two chrominance dimensions (u' and v')' and the IPT color space, in which the three variables represent a lightness dimension (I), a red-green dimension (P), and a yellow-blue dimension (T).

Other color spaces include area coverage spaces, such as the Neugebauer Primary area coverage (NPac) color model. An NPac in the NPac color space represents a statistical distribution of Neugebauer Primaries (NPs) over an area of a halftone. In a simple binary (bi-level, i.e. two drop states: "drop" or "no drop") printer, an NP may be one of $2^k-1$ combinations of k printing fluids within the printing system, or an absence of printing fluid (resulting in $2^k$ NPs in total). An NP may thus be seen as a possible output state for a print-resolution area. The set of NPs may depend on an operating configuration of a device, such as a set of available colorants. A colorant or printing fluid combination as described herein may be formed of one or multiple colorants or printing fluids. For example, if a bi-level printing device uses CMY printing fluids there can be eight NPs or output states. These NPs relate to the following: C, M, Y, CM, CY, MY, CMY, and W (white or blank indicating an absence of printing fluid). An NP may comprise an overprint of two available printing fluids, such as a drop of magenta on a drop of cyan (for a bi-level printer) in a common addressable print area (e.g. a printable "pixel"). An NP may be referred to as a "pixel state".

In multi-level printers, e.g. where print heads are able to deposit N drop levels, an NP may include one of $N^k-1$ combinations of k printing fluids, or an absence of printing fluid (resulting in $N^k$ NPs in total). A multi-level printer may use a piezo-electric or thermal print head that is capable of depositing different numbers of drops or different drop volumes, and/or may use multiple passes of a print head, to enact different drop states. For example, if a multi-level printer uses CMY printing fluids with four different drop states ("no drop", "one drop", "two drops" or "three drops"), available NPs can include C, CM, CMM, CMMM, etc. A "drop sequence" as used herein may define a set of drop states used or useable by a given printing system in a given operating state.

An NPac space provides a large number of metamers. Metamerism is the existence of a multitude of combinations of reflectance and emission properties that result in the same perceived color for a fixed illuminant and observer. Multiple NPacs in an NPac space may have a similar colorimetry. Several NPacs may thus be useable to represent a given color. Different NPacs that have similar colorimetry may, however, have differing attributes or properties other than colorimetry.

Each NPac may therefore define a probability distribution for colorant or printing fluid combinations for each pixel in the halftone (e.g. a likelihood that a particular colorant or printing fluid combination or available output state is to be placed or defined at each pixel location in the halftone). In this manner, a given NPac defines a set of halftone parameters that can be used in the halftoning process to map a color to NPs to be statistically distributed over the plurality of pixels for a halftone. Moreover, the statistical distribution of NPs to pixels in the halftone serves to control the colorimetry and other print characteristics of the halftone.

Spatial distribution of NPs according to the probability distribution specified in the NPac may be performed using a halftone method. Examples of suitable halftoning methods include matrix-selector-based Parallel Random Area Weighted Area Coverage Selection (PARAWACS) techniques and techniques based on error diffusion. This may result in discrete deposit instructions for print resolution pixels, e.g. instructing 0 to N drops of each of the k printing fluids on an addressable area of a print medium. Over a plurality of addressable areas, e.g. an area of print substrate, having a color defined by an NPac, the distribution of the printed output will tend towards the statistical distribution of area coverage defined by the NPac. An example of a printing pipeline that uses area coverage representations for halftone generation is a Halftone Area Neugebauer Separation (HANS) pipeline.

A color separation process may employ mappings between colors defined in a first color space and corresponding colors defined in a second color space. Such mappings may be stored in a data structure. For example, the mappings may be stored in a lookup table which may be accessed by the color separation process to map between color spaces. In some examples, a lookup table is used to map colorimetric values to vectors in an area coverage space. For example, the lookup table may map RGB or CMYK color values to NPacs. In some examples, the lookup table maps XYZ, LAB or any other color space used to specify a device color space. Where the vectors comprise NPacs, the lookup table may be referred to as a "HANS lookup table". When an RGB mapping is used, the HANS lookup table may comprise $17^3$ (i.e. 4913) entries. When a CMYK mapping is used, the HANS lookup table may comprise $9^4$ (i.e. 6561) entries. The HANS lookup table may comprise a one-to-one mapping from input color values to NPacs.

Determination of the mappings between corresponding color values in different color spaces may be a complex and time-process process. Determination of the mappings may involve printing and color-measuring NPacs, and then assigning NPacs to input color values (e.g. RGB values) in a color lookup table based on the measured colorimetries of the NPacs. Such assignment may be performed manually, e.g. using trial and error to define color transitions. Where the output color space is an NPac color space, the dimensionality is defined by the total number of NP states that are available for a given printing system in a given operating state, which in some cases may be in the order of 100,000 states or more. The total number of NP states are in turn dependent on the number of different colorants or printing fluids used by the printing system. The number of possible colorant combinations grows exponentially as additional colorants are introduced into the printing system. Some printing systems may use at least 9 colorants, with some colorants having multiple implementable drop-weight states. If a colorant channel is defined as a given colorant having a given implementable drop-weight state, printing systems may comprise 14 colorant channels or more. Accordingly, due to the size and/or dimensionality of NPac space, manual pre-calculation of mappings for population of a lookup table may be impractical.

In some cases, a HANS lookup table can be populated by manually selecting NPacs from a set of color-measured NPacs and assigning the selected NPacs to the vertices of an RGB cube. The assigned NPacs for the vertices may then be used to seed an interpolation process to obtain NPacs for the edges and the interior of the RGB cube. However, simply interpolating between the vertices of the RGB cube may allow relatively little control over which NPacs are derived for the edges and diagonals of the RGB cube. The edges and diagonals correspond to color transitions. Which NPacs are used for the edges and diagonals of the RGB cube can influence the resulting smoothness of such color transitions in NPac space, as well as other visual and non-visual properties arising from the HANS lookup table, e.g. grain and colorant usage. Thus simply interpolating between NPacs assigned to the vertices of the RGB cube allows little control over the resulting properties of the NPacs representing color transitions.

Color-measured NPacs, as with any color values, may be represented in a color space. Such a color space may be represented in at least three dimensions, referred to herein as a "3D color space". For example, color-measured NPacs may be represented in LAB space, where the position of a given NPac in LAB space corresponds to the measured colorimetry of that NPac. In some examples, the NPacs are represented in IPT space.

Figure 1:
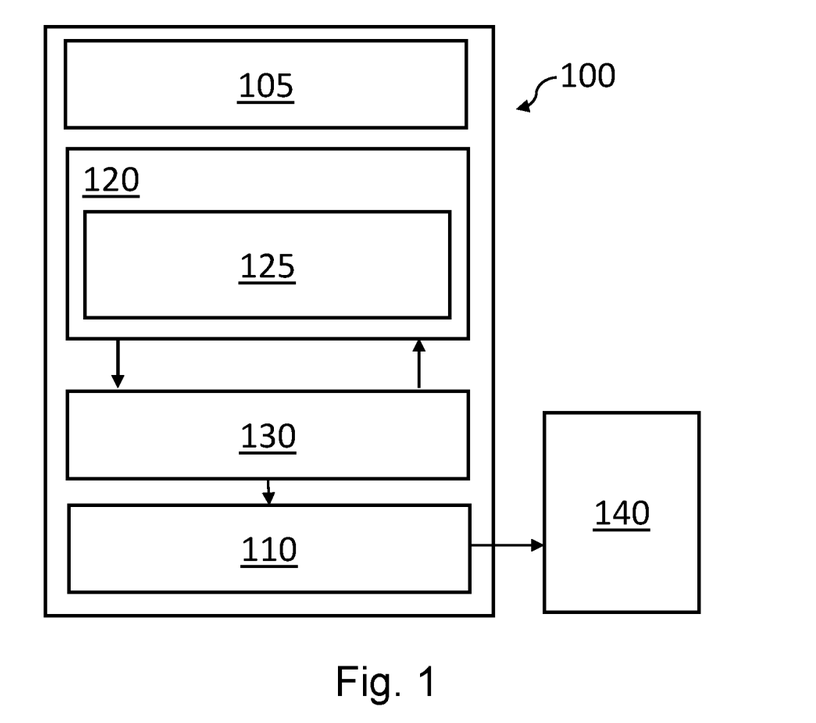
FIG. 1 is a schematic diagram of a print system according to examples.

FIG. 1 shows a printing system 100 according to an example. Certain examples described herein may be implemented within the context of this printing system.

The printing system 100 may be a 2D printing system such as an inkjet or digital offset printer, or a 3D printing system, otherwise known as an additive manufacturing system. In the example of FIG. 1, the printing system 100 comprises a printing device 110, a memory 120 and a processor 130. The processor 130 may be implemented using machine readable instructions and/or be suitably programmed or configured hardware.

The printing device 110 is arranged to apply a print material to a print target in a printing process, to produce a print output 140. The print output 140 may, for example, comprise colored printing fluids deposited on a substrate. The printing device 110 may comprise an inkjet deposit mechanism, which may for example comprise a nozzle to deposit printing fluid on the substrate. The inkjet deposit mechanism may include circuitry to receive instructions associated with depositing printing fluid. The printing device 110 may comprise a multi-level drop-weight printing device. A multi-level drop-weight printing device is a printing device that is configured to deposit printing fluids with more than one possible drop-weight. In 2D printing systems, the substrate may be paper, fabric, plastic or any other suitable print medium.

A printing fluid may be otherwise referred to as a "colorant". A colorant may correspond to a given base color, where other colors may be formed from combinations of colorants. Examples of base colors include, but are not limited to, cyan, magenta, yellow, red, green and blue and black. The number of colorants implementable by the printing system 100 may be less than the number of possible colorant combinations, e.g. NPs, based on the given set of colorants.

In 3D printing systems, the print output 140 may be a 3D printed object. In such systems, the substrate may be a build material in the form of a powder bed comprising, for example, plastic, metallic, or ceramic particles. Chemical agents, referred to herein as "printing agents", may be selectively deposited onto a layer of build material. In one case, the printing agents may comprise a fusing agent and a detailing agent. The fusing agent and detailing agent may control a temperature of a bed of build material. The fusing agent may comprise an energy-absorbing chemical compound that acts to increase a temperature of a portion of build material. The detailing agent may comprise a cooling agent, such as a water-based liquid, that acts to reduce a temperature of a portion of build material. In this manner, a fusing agent may be selectively applied to a layer in areas where particles of the build material are to fuse together, and a detailing agent may be selectively applied where the fusing action is to be reduced. In some examples, the printing agents may comprise colorants and may be deposited on a white or blank powder to color the powder. In other examples, objects may be constructed from layers of fused colored powder.

The memory is arranged to store, for a transition region between two input color space nodes in an input color space, data 125 representing a set of candidate output color space nodes in an output color space. A color space node may also be referred to as a color value. A color space node may be representable within a color space by respective coordinates corresponding to the axes or dimensions that define the color space. For example, a color space node may have, for each of first, second and third axes defining a 3D color space, a respective coordinate. A color space node or value may thus indicate a position in a color space which corresponds to a color.

The transition region may be between two vertices in the input color space. In other words, the two input color space nodes may comprise vertices in the input color space. The input color space, which may be for example an RGB or CMYK color space may be represented as a 3D cube. The cube has eight vertices, each vertex corresponding to one of the primary or secondary colors of the color space, or white or black. For example, the vertices may correspond to red, green, blue, cyan, magenta, yellow, black and white. Each pair of vertices may be connected by a color transition or ramp. Examples of such transitions include white-red, cyan-blue, black-green, etc. A given transition, or transition region may therefore by defined by a trajectory along successive transition points in a color space.

In some examples, the set of candidate output color space nodes comprises a set of NPacs. An NPac defines a statistical distrubtion of an operating set of colorant combinations, or Neugebauer Primaries (NP's), implementable by the printing system 100 over an area of a halftone. The output color space may be an NPac color space. For example, the candidate output color values may comprise NPacs in NPac space. In some examples, the output color space is a CIELAB color space. The candidate output color values may comprise NPacs represented in CIELAB space for example. The set of candidate output color space nodes may comprise other types of color values in other examples. For example, the set of candidate output color space nodes may comprise a set of colorant vectors. In some examples, the input color space is an RGB color space.

In examples where the set of candidate output color space nodes comprises a set of NPacs, the operating set of colorant combinations corresponds to an operating set of NPs. The operating set of colorant combinations may correspond to an operating state of the printing system 100 and/or of a printing process implemented by the printing system 100. An operating state may be a configuration of the printing system 100 that influences how the printing process is performed by the printing system 100. In examples, the operating state relates to a constraint of the printing process and/or of the printing system 100 implementing the printing process. For example, different printing systems may have different operating characteristics, relating to the constraints or capabilities of the different printing systems. In some examples, a given printing system may be configurable with different operating states, for example where a given operating state is associated with a given printing process of a plurality of printing processes performable by the printing system. A constraint may relate to the use of NPs over a HANS look-up table. An operating set of NPs may be a predetermined set of NPs over which a color look-up table can define NPacs. For example, the operating set of NPs may be dependent on a colorant drop sequence of a printing process performed by the printing system 100.

The set of candidate output color space nodes may be a subset of all available output color space nodes that are implementable by the printing system 100. The set of candidate output color space nodes may be considered a 'sampled pool' of output color space nodes, from which output color space nodes that can represent the transition region may be selected and/or derived. In some examples, the set of candidate output color space nodes comprises combinations of colorants that are involved in the transition. For example, where the output color space nodes comprise NPacs which are formed from those NPs that include colorants that are involved in the given transition. In some examples, the set of output color space nodes does not comprise colorants that are not involved in the transition. The set of output color space nodes may comprise combinations of colorants that are involved in the transition up to a given colorant limit. The given colorant limit may be dependent on the print medium or substrate used by the printing system 100.

In some examples, the printing system 100 may comprise a measurement device 105. The measurement device 105 may be arranged to obtain a measurement of an optical property of the color space nodes in the set of color space nodes. An example optical property to be measured is a reflectance spectrum. The measurement device 105 may be arranged to obtain a measurement of the colorimetry of each output color space node in the set of candidate output color space nodes. The colorimetry may be measured from one or more printed patches. The measured colorimetries may be useable to derive coordinate values for each of the first, second and third axes in a 3D color space for each of the candidate output color space nodes. For example, the measured colorimetries may be useable to represent the candidate output color space nodes in a CIELAB or IPT color space. The measurement device 105 may be an optical measurement device. The optical measurement device may comprise a color measurement device. Examples of optical measurement devices include, but are not limited to, photodiodes, spectrophotometers, spectrofluorometers, spectrocolorimeters, tristimulus colorimeters, densitometers and lightness sensors. In some examples, the measurement device 105 is separate from the printing system 100.

The measurement device 105 may be communicatively coupled to the printing system 100, for example via an interface (not shown). In an example, the interface comprises a physical connection. The physical connection may be, for example, a Universal Serial Bus (USB) and/or serial data connection to electrically couple a measurement device 105 such as a spectrophotometer and/or colorimeter, wherein data values are transmitted using an appropriate communication protocol over the interface. The interface may comprise a wired or wireless interface. In an example, the interface comprises a user interface. The user interface may, for example, comprise graphical components such as form fields to receive color measurement data, e.g. data output by a separate measurement device 105. In some examples, the interface is to receive input from an optical measurement device 105.

The transition region comprises a sub-region. The sub-region may be referred to as a "bin" or "sub-division" of the transition region. In some examples, the transition region comprises a plurality of sub-regions. A sub-region may be a division of a color space. The sub-region may comprise a one-dimensional (1D), two-dimensional (2D) or three-dimensional (3D) sub-region. A 1D, 2D or 3D sub-region may comprise a length, an area or a volume in a color space, respectively. For example, a 3D sub-region may comprise a cube in color space. The dimensionality of the sub-region may depend on the transition, e.g. the two input color values between which the transition is defined. For example, 1D sub-regions may be used for some color transitions, and 3D sub-regions may be used for other color transitions. 1D sub-regions may be used for transitions that involve a single printing fluid, for example. Where the set of candidate output color values are represented in a CIELAB color space, 1D sub-regions may correspond to L* slices in the color space. 3D sub-regions, on the other hand, may be used for transitions that involve multiple printing fluids. For example, a composite gray ramp involving cyan, magenta and yellow printing fluids may be divided into 3D sub-regions, e.g. cubes in color space. In some examples, the dimensionality of the sub-region is dependent on a complexity of the set of candidate output color space nodes. For example, the dimensionality of the sub-region may be dependent on the number of colorants used in the set of candidate output color space nodes.

The processor 130 may be arranged to instruct the printing device 110 to output a set of calibration points for a particular transition, for example the white-red ramp. The set of calibration points may be a subset of all available output color space nodes that are implementable by the printing system 100. The processor 130 may then determine a plurality of NPac points and the set of NPs for each of the calibration points. As mentioned above, this may be via the use of a measurement device 105 capable of obtaining a measurement of an optical property of the calibration points.

The calibration points for the particular transition may then be represented in a particular 3D color space, such as IPT, although other color spaces may be used, including CIELAB and XYZ, as mentioned previously. For each ramp, a hue angle is then determined. The hue angle and color space chosen, is based on the maximization of the response, as will be described in further detail below with reference to FIG. 4.

An intersection between a convex hull of the calibration point NPacs in the color space and a plane extending through the color space at the hue angle is then generated, as will be described with reference to FIG. 5 below. The intersection may be used to determine a first and second node, whereby the first and second nodes represent the most chromatic, and the least chromatic nodes of the intersection. The processor 130 then generates a lookup table based on a relationship between the nodes of the intersection, and the known NPac points of the calibration points. The lookup table comprises values for mapping between a first and second color space. For example, between IPT and CMYK. The lookup table is then provided to the printing device 110, so that it may be used by a printing device 110 to produce an output 140.

In some examples, the processor 130 may be a print controller, capable of controlling the output of a printing device 110. Alternatively, the printing system 100 may comprise a separate print controller (not shown) arranged to control the output of the printing device 110, in such examples, the processor may be arranged to generate the lookup table, and store it in memory 120 for example, as part of the input data 125, for use by the print controller.

In some examples, the memory 120 comprises a lookup table for storing data mapping an input color space to an output color space. Data indicating the derived set of halftone parameters may be stored in the lookup table. For example, the lookup table may map colorimetric values to vectors in an area coverage space. Each vector in area coverage space may comprise a set of halftone parameters. In some examples, the lookup table maps RGB or CMYK color values to NPac points.

The processor 130 is further arranged to cause the printing device 110 to use the derived set of halftone parameters in a printing process. For example, print instructions may be received, comprising color values in an input color space. The processor 130 may transform the color values in the input color space to halftone parameters using a color lookup table, and apply the halftone parameters indicated in the color lookup table during the printing process.

In some examples, the processor 130 is arranged to select further output color space nodes for further sub-regions of the transition region and/or for further transition regions. This results in a distribution of selected output color space nodes in the color space, one per sub-region, which are selected according to their associated attributes. The distribution of selected output color space nodes may be used to seed an interpolation operation, as will be described in more detail below.

The lookup table may then be used by the printing device 110 to produce an output 140 such that the NPs used in the output 140 are representative of values of the lookup table and provide an accurate color representation of the input data, for example an image on a display represented in and RGB color space.

Figure 2:
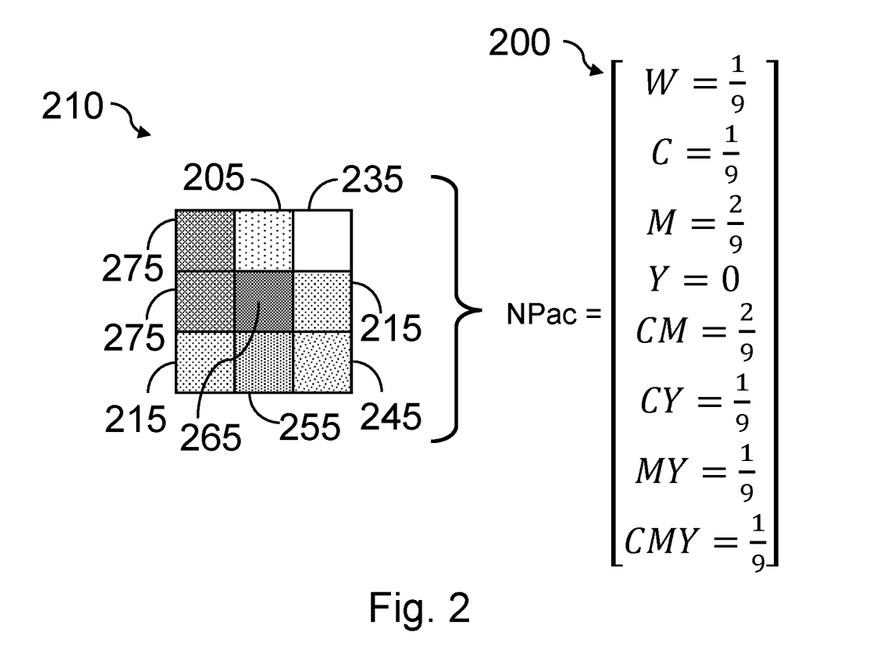
FIG. 2 is schematic diagram showing a representation of a Neugebauer Primary area coverage according to an example.

FIG. 2 shows an example NPac 200 for use in a CMY imaging system. The NPac 200 may correspond to an output color space node derived in accordance with examples described herein. This example shows a three-by-three pixel area 210 of a print output where all pixels have the same NPac: 200. The NPac 200 defines the probability distributions for each NP for each pixel, for example a likelihood that NP, is to be placed at the pixel location. Hence, in the example print output there is one pixel of White (W) 235; one pixel of Cyan (C) 245; two pixels of Magenta (M) 215; no pixels of Yellow (Y); two pixels of Cyan+Magenta (CM) 275; one pixel of Cyan+Yellow (CY) 255; one pixel of Magenta+Yellow (MY) 205; and one pixel of Cyan+Magenta+Yellow (CMY) 265. Generally, the print output of a given area is generated such that the probability distributions set by the NPac of each pixel are fulfilled. For example, the NPac may be affected by a halftone stage that implements the spatial distribution of colorants combinations defined by the vector, e.g. via a series of geometric shapes such as dots of predetermined sizes being arranged at predetermined angles. As such, an NPac is representative of the colorant overprint statistics of a given area. Although a CMY system is used for ease of explanation, other imaging systems may be used.

Figure 3:
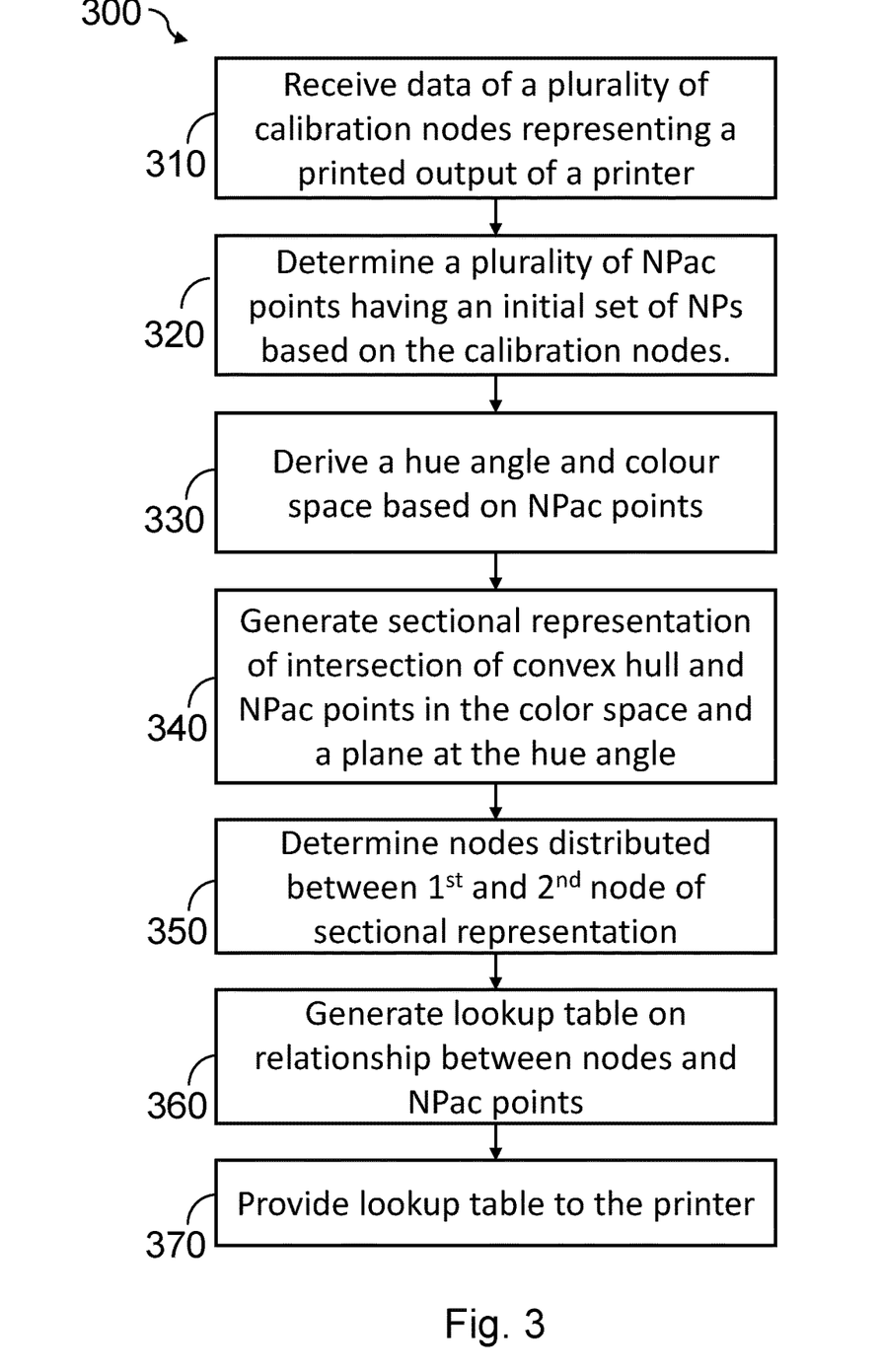
FIG. 3 is a flow chart illustrating a method according to an example.

FIG. 3 shows a method 300 according to an example. In some examples, the method 300 is performed by a processor, such as the processor 130 described with reference to FIG. 1. The processor 130 may perform the method 300 based on instructions retrieved from a computer-readable storage medium.

At item 310, data representing a plurality of reference values are obtained by the printing system 100. The reference values may be representative of a printed output, such as output 140 of a printing device 110. The reference values may be representative of a particular transition region between two input color values in an input color space. In some examples, the transition region is between two vertices in the input color space.

At item 320, the NPac points of the reference values is obtained. In some examples, each of the reference values may comprise a set of output color values, which are representative of the NPac points. Each NPac point represents an initial set of NPs in the output color space for reproducing the color as an output 140 on the printing medium. The output color values may be obtained using a measurement device 105 as described above, which is capable of determining one or more properties of the calibration node such that each node may have, for each of a first, second and third axes defining a 3D color space, a respective coordinate value. The data representing the reference values may be generated, or may be received from a further entity for example, data previously obtained and stored in memory 120 of a printing system. In other examples, a subset of the reference values may be analyzed and the coordinates obtained for each of the subset may be determined using a measurement device 105. Coordinates for the remaining reference values may then be obtained by interpolating values between one or more measured coordinate values of the subset of reference values.

Figure 4:
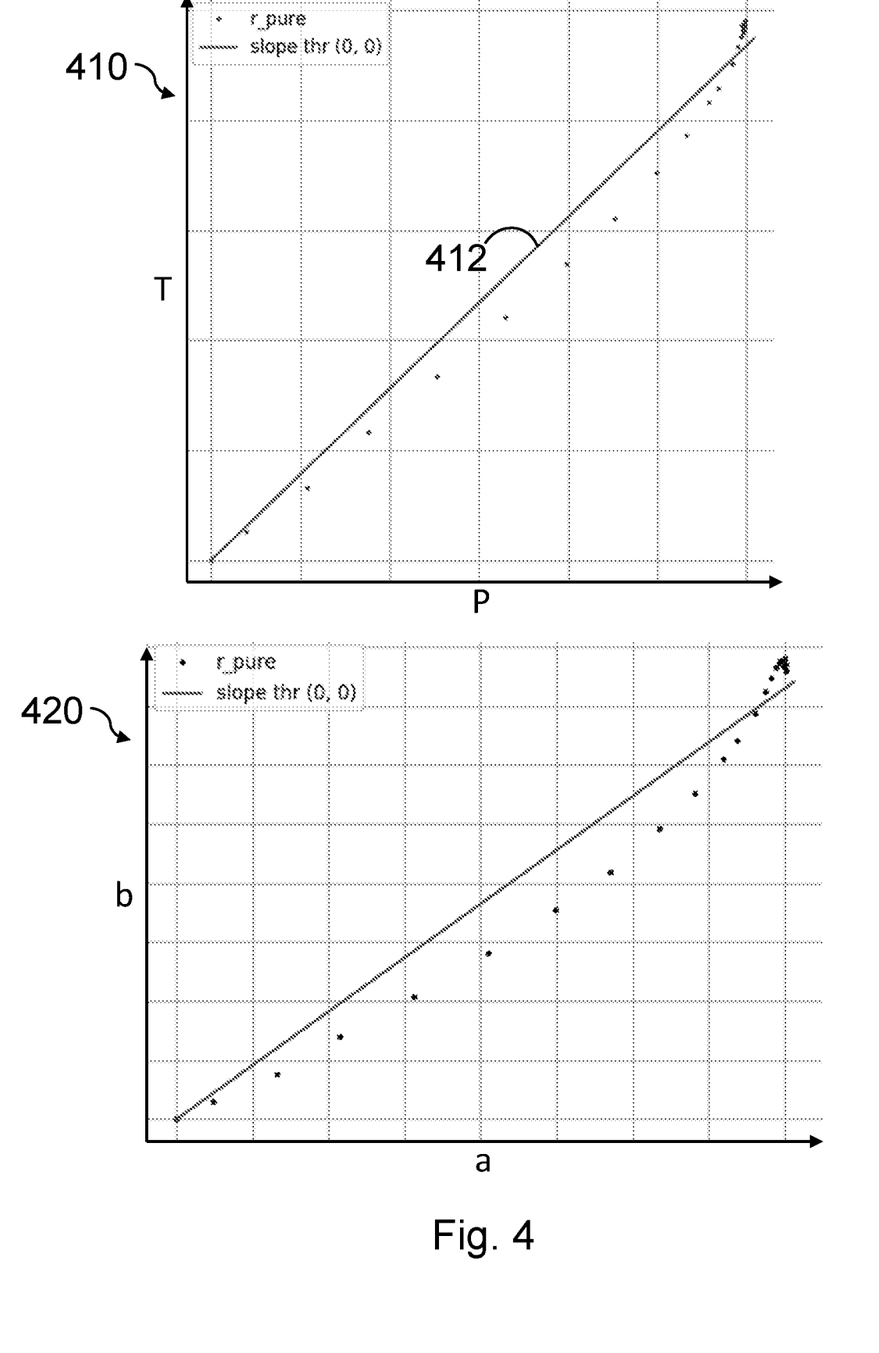
FIG. 4 shows two graphs showing Neugebauer Primary area coverage points presented in two differing color spaces.

At item 330, the NPac points representing each of the reference values are used to determine a color space and a hue angle. To determine which color space is the most optimal for representing the output for a particular transition region, the coordinates of each NPac point are used to determine which color space represents that particular transition region in the most linear way. In some examples, this may be achieved using only the color coordinates that is, when represented in the CIELAB color space, the 'ab' values, or when represented in the IPT color space, the 'PT' values. As shown in FIG. 4, each representation 410, 420 may produce differing outputs. For example, the representation 410 in the IPT color space produces a relatively linear output when compared to the representation 420 in the CIELAB color space. Accordingly, for the example set of reference values represented in 410 and 420 of FIG. 4, it will be most desirable to use the IPT color space as shown in representation 410.

Using the selected color space, for example the IPT color space based on the representations shown in FIG. 4, a hue angle may be determined by. Where there is a printing color or colorant in the printing system, such as printing system 100 of FIG. 1, which represents the transition region, this may be used as a basis for determining the hue angle. NPacs using only the desired colorant may be shown in relation to the NPacs of the calibration values, and represents the optimal hue angle, as shown by the line 412 of FIG. 4. In examples, where there is no printing color or colorant in the printing system 100 representative of the transition region, then the NPac points of the calibration values may be used to determine the hue angle. This is achieved by measurements in the selected color space, and determining an angle which maximizes the gamut. That is an angle needs to be selected, such that the line, such as 412 of FIG. 4 passes through or as close as possible to the majority of the NPac points when represented in a two-dimensional color space. The hue angle is representative of the angle of the line 412 with respect to the origin. The two-dimensional color space may be representative of the NPac points without the lightness components. That is in the CIELAB color space, the NPac points will comprise the 'ab' components, and in the IPT color space, the NPac points will comprise the 'PT' components.

Figure 5:
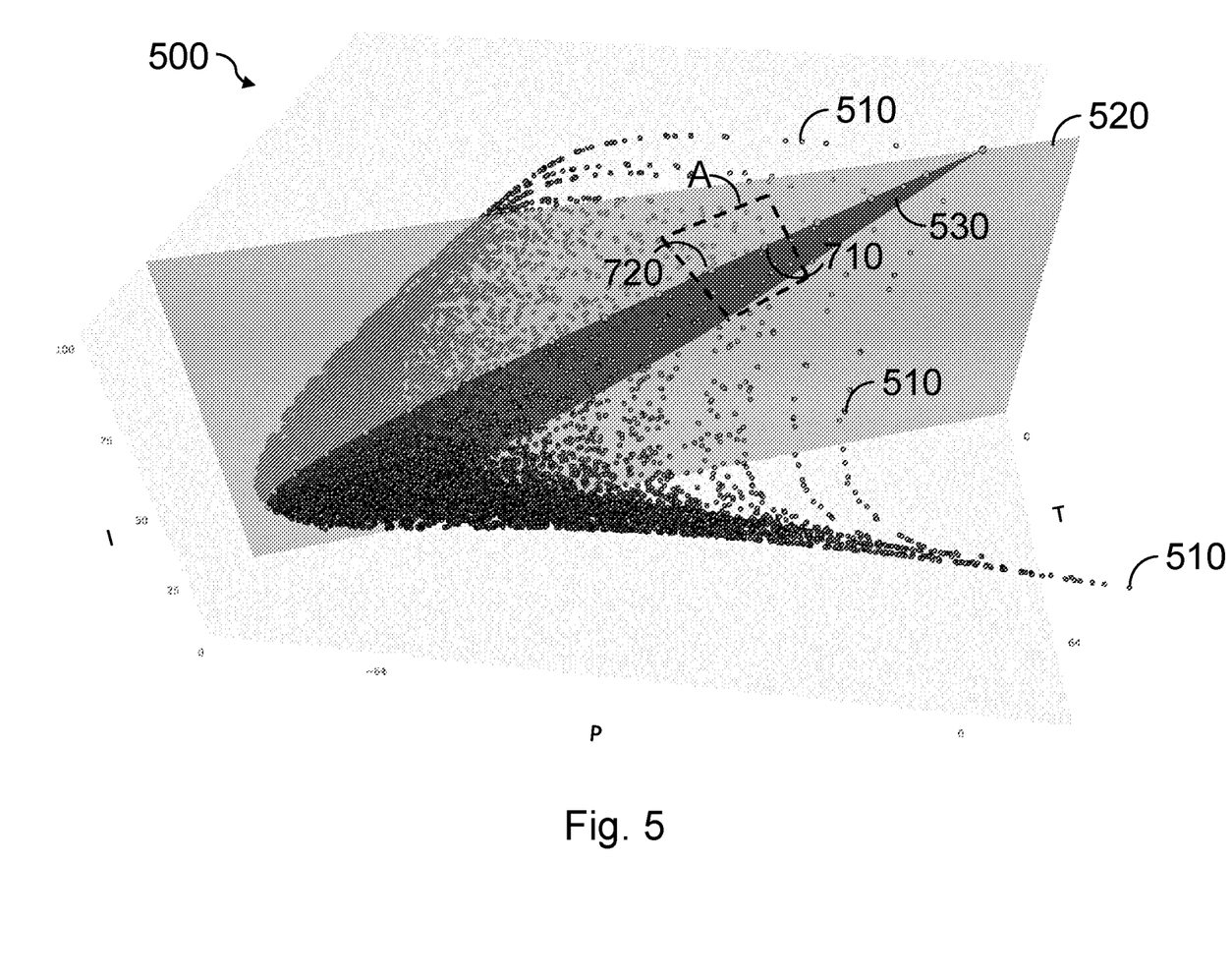
FIG. 5 is a graph showing Neugebauer Primary area coverage points plotted against in a color space according to an example.

At item 340, a sectional representation of an intersection between a convex hull representing the NPac points in the color space, and a plane extending through the color space, at the hue angle determined at item 330 is generated, an example of the generation of the sectional representation is shown in FIG. 5. FIG. 5 shows a graphical representation 500 the NPac points, 510 mapped in the determined color space, in this example the IPT color space.

The graphical representation 500 shows the NPac points 510 in the determined color space, wherein the NPac points 510, as mentioned above, comprise known/measured values for each of the I, P and T axis. The graphical representation 500 also shows a plane 520. The plane 520 extends through the color space at the hue angle determined at item 330. The intersection between the plane 520 and the plurality of NPac points results in a convex hull 530. An example of the convex hull 530 formed by the intersection of the NPac points 510 and the plane 520 is shown in further detail in FIG. 6.

Figure 6:
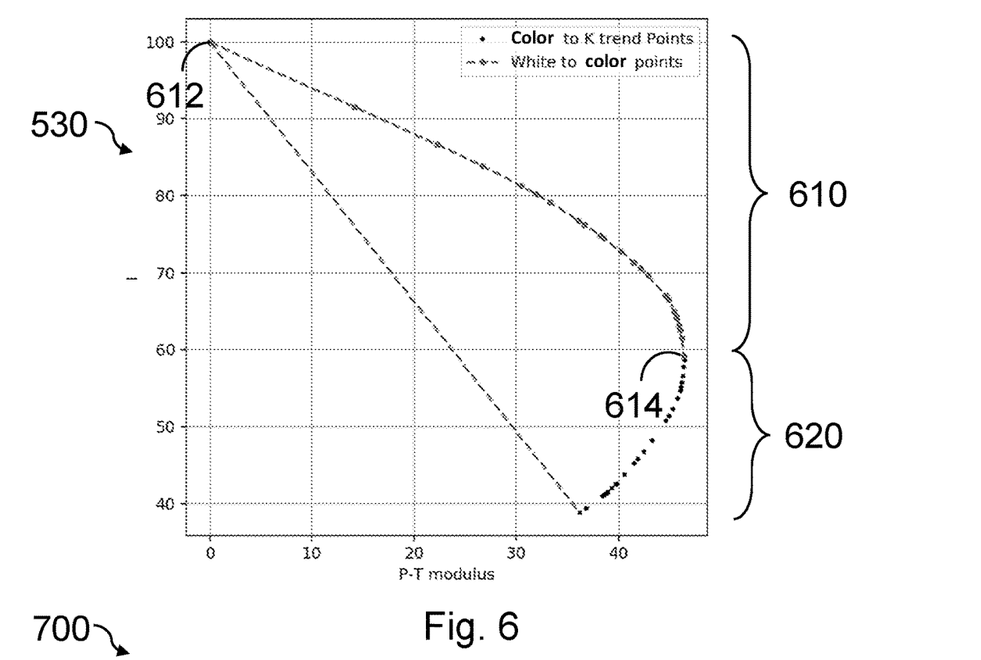
FIG. 6 is a graph showing an intersection between a set of Neugebauer Primary area coverage points and a plane in the color space.

FIG. 6 shows the convex hull 530 formed by the intersection of the plane 520 and the NPac points 510. At item 350, where a first node 612 and second node 614 of the convex hull 530 are determined. In some examples, the first node 612 and second node 614 are representative of the extremes of the gamut of the convex hull 530. The first 612 and second 614 nodes represent points of the convex hull 530 where the color is the most and least chromatic. The convex hull 530 shown in FIG. 6 represents two different transition regions. The first region 610 is a white-to-color transition region, which extends from the first node 612, representing white (i.e. the least chromatic color), to the second node 614, representing the color of the transition region (i.e. the node with the most chromatic response). The second region 620 represents a color-to-K (or color-to-black) transition region, which extends from the second node 614 to the black node.

Figure 7:
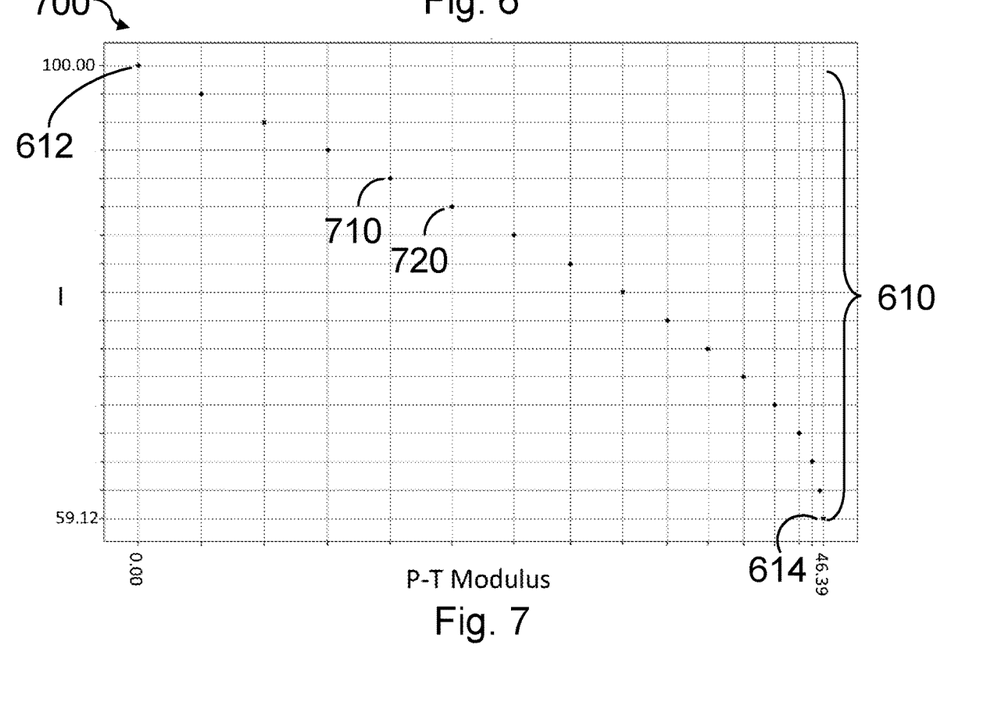
FIG. 7 is a graph showing nodes generated between a first node and a second nodes of the intersection shown in FIG. 6.

At item 360, the look up table of values representing a mapping from the first color space to the second color space is generated. Using the first node 612 and second node 614 of the convex hull 540, a series of nodes, for example 710 and 720 of FIG. 7 are generated. FIG. 7 shows a transition region 610 representative of a white-to-color transition region, with nodes distributed substantially evenly along the lightness axis (for example the I axis in an IPT color space or the L axis in the CIELAB color space), between the first node 612 and second node 614, such that each of the series of nodes 710, 720 correspond to a point on the convex hull 530. Nodes 710, 720 need not be distributed substantially evenly along the lightness axis, but may be distributed in an alternative arrangement. Using the series of nodes 710, 720, values representing each of these nodes within the color space may be determined.

Each of the series of nodes 710, 720 may be translated from the two-dimensional domain, into the three-dimensional domain representative of the 3D color space. When translated into the 3D color space, these points will be represented amongst the NPac points, as shown in FIG. 5, where the series of nodes 710, 720 are shown amongst the NPac points 610 along the convex hull 530.

Figure 8:
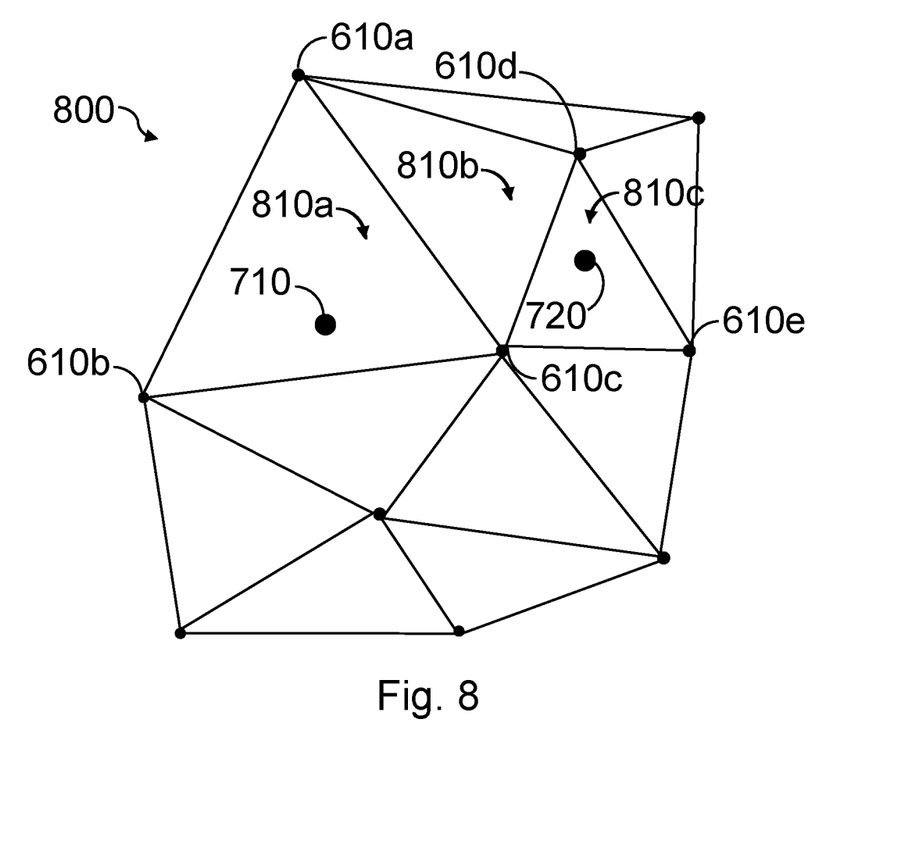
FIG. 8 shows a Delaunay triangulation of Neugebauer Primary area coverage points of Region A of FIG. 5.

FIG. 8 shows a region 800 of the NPac points in the 3D color space, for example region A shown in FIG. 5. To determine the values of each of the series of nodes 710, 720, in the 3D color space, in some examples, a Delaunay triangulation may be generated between respective nodes 610a, 610b, 610c, 610d, 610e. The Delaunay triangulation creates a series of triangles 810a, 810b, 810c such that no other node 610a, 610b, 610c, 610d, 610e is inside the circumcircle of any triangle formed by three neighboring nodes 610a, 610b, 610c, 610d, 610e.

Each of the series of nodes 710, 720 will lie within one of the plurality of triangles 810a, 810b, 810c created by the Delaunay triangulation. For example, node 710 lies within triangle 810a formed by nodes 610a, 610b, 610c. Since the relative values of the nodes 610a, 610b, 610c in the 3D color space are known, via the previous analysis and/or calculation, the values in the 3D color space of node 710 may be determined by calculating barycentric coordinates for said node 710. Similarly, node 720 lies within the triangle 810c formed by nodes 610c, 610d, 610e, and the barycentric coordinates of node 720 may be calculated with respect to these nodes 610c, 610d, 610e. As the NPs, and the respective ratios of each NP are known, the NPs of the nodes 710, 720 may be calculated based on the barycentric coordinates.

Once the values of each NP have been determined for each of the nodes 710, 720, they may entered into the lookup table so as to define the transition region for a particular color. The lookup table may then be stored in memory, such as 120 of FIG. 1, for use in the printing of an output 140 by a printing device 110. When used by a printing device, such as 110 of FIG. 1, the lookup table comprises deposit instructions for print resolution pixels, e.g. instructing 0 to N drops of each of the k printing fluids on an addressable area of a print medium. Therefore the lookup table maps colorimetric values to vectors in an area coverage space.

In some examples, print control data is received for a printing operation. The print control data comprises a set of input color values in the input color space. In other words, the set of input color values in the input color space may be provided as an input for a printing operation. The generated mapping data stored in the lookup table may then be used to perform the printing operation. For example, the mapping data may be used to map from the received input color values to output color values in the output color space, which may be a print color space, such that the output color values can be used in the printing operation. Therefore, the set of color values comprised in the print control data, namely the set of input color values, may be expressed as color values in the print color space of the printer, namely the set of output color values, in order for the printer to perform the printing operation based on the print control data.

In some examples, an additional output color value is selected based on a target value of a further metric, the further metric being different from the first metric. In some examples, the additional output color value is selected from the set of candidate output color values. In other examples, the additional output color value is selected from a further set of candidate output color values. The selecting the additional output color value may be for a further transition region between two further input color values. As such, different metrics may be used to select output color values for different color transitions. For example, a first metric may be used to select output color values for a transition of white to green, and a second, different metric may be used to select output color values for a transition of black to red. Different transition regions may have different corresponding sets of candidate output color values, from which output color values may be selected.

Different metrics or criteria may be used to select output color values for different transitions.

For transitions from white to cyan, magenta or yellow (the so-called 'primary colors') with dual drop-weight states, grain may be reduced by using low drop-weight color space nodes until grain is not visible and then introducing high drop-weight color space nodes so as to not force a firing frequency in any of the drop-weights and thus avoid banding and/or aerodynamic image quality defects.

For transitions from white to black using multiple black printing fluids (e.g. dual drop-weight gray, dual drop-weight photo black, matte black, etc.), darker printing fluids can be introduced at the points where their respective grain is not visible. As such, all black colorants may be utilized at the same time, instead of switching from colorant to colorant with an overlap of at most two colorants, as in a comparative case. Trenches may be kept at low frequency, and a quantity of lighter colorants may be kept throughout the full transition, allowing for reduced grain. A relatively large number of colorants may thus be managed simultaneously, which may be difficult without using the examples described herein.

Transitions from white to red, green or blue (the so-called 'secondary colors') can involve a large number of colorants. For example, a white to blue transition may involve cyan, magenta, and blue, all with dual drop-weights, resulting in a total of 6 colorant channels. Examples described herein may allow such complexity to be managed with less difficulty than would be the case without using the examples described herein. Secondary transitions may be generated, which traverse from low drop-weight mixtures to high drop-weight chromatic colorants (e.g. pure red, green or blue), resulting in smooth color transitions having a stable hue and a reduced grain, whilst enabling certain colorant mixtures that introduce defects to be avoided.

For transitions from primary and secondary colors to black, there may be a trade-off between colorant usage and gamut. A minimum quantity of colorant may be used for such transitions that yields a convex gamut.

For transitions between hue-adjacent pairs of colors (so-called 'color-to-color transitions'), lighter colorants may be gradually introduced through the transition. For example, for a transition from yellow to red, a low drop-weight magenta colorant may be introduced before introducing the red colorant. Such methods reduce grain and enable a smoother transition compared to a case in which simple interpolation between RGB vertices is performed. In such a comparative case, yellow and red colorants may be mixed in the interpolated color values, which may result in undesirable levels of grain.

Processor 130 can include a microprocessor, microcontroller, processor module or subsystem, programmable integrated circuit, programmable gate array, or another control or computing device. The computer-readable storage medium 120 can be implemented as one or multiple computer-readable storage media. The computer-readable storage medium 120 includes different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. The computer-readable instructions 630 can be stored on one computer-readable storage medium, or alternatively, can be stored on multiple computer-readable storage media. The computer-readable storage medium 120 or media can be located either in the printing system 100 or located at a remote site from which computer-readable instructions can be downloaded over a network for execution by the processor 130.

Certain examples described herein enable sets of NPac points to be selected and/or derived which produce smooth, visually pleasing color transitions. Thus a resulting visual quality of output images may be increased compared to a case in which the examples described herein are not used. By selecting NPac points for a color transition from a set of color-measured NPac points based on target metric values as well as colorimetry, finer control may be obtained in the selection and/or derivation of NPac points to represent the color transitions. The likelihood of obtaining NPac points which have undesirable properties is reduced, thus increasing the resulting visual quality of the transition.

Certain examples described herein enable a color lookup table mapping between color spaces to be populated computationally. Such examples may be less time-consuming, less error-prone and involve less user burden than comparative methods in which lookup tables are populated manually, e.g. through trial and error. Computational methods such as those described herein may be performed without a human expert being present to visually inspect and/or select color values to populate the lookup table.

Certain examples described herein enable smooth transitions to be obtained in a print color space, where a given transition involves multiple different printing fluids. For such complex color transitions involving several printing fluids or colorants, there may be a large number of NPac points having a similar colorimetry but different properties or attributes. Some properties or attributes may be more desirable than others, e.g. in terms of output grain, colorant usage, etc. Selecting NPac points for sub-regions of a transition based on values of predetermined metrics in addition to colorimetry allows finer control of such properties. Thus smooth transitions having desired properties may be obtained even for complex cases involving multiple different colorants.

Certain examples described herein enable a gamut of a print color space of a printer to be increased, thereby increasing a visual quality of a printed output. By binning transition regions and selecting an NPac point per bin, rather than interpolating between the end-points of the transition region, a wide gamut may be produced, since the resulting print color space includes an NPac point with a colorimetry corresponding to every bin.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A print calibration system comprising:
a printing device to apply print material to a print target in a printing process;
a memory for storing a lookup table; and
a processor to:
cause the printing device to print a plurality of calibration points for reproducing a color ramp;
receive a plurality of Neugebauer Primary area coverage points having an initial set of Neugebauer Primaries representing the plurality of calibration points;
determine a hue angle and color space based on the plurality of Neugebauer Primary area coverage points;
generate a sectional representation of an intersection between a convex hull of the plurality of Neugebauer Primary area coverage points and a plane extending across the color space at the hue angle;
determine a plurality of nodes distributed between a first node and a second node of the sectional representation;
generate a lookup table based on a relationship between the plurality of nodes and the plurality of Neugebauer Primary area coverage points for use during the printing process, wherein the lookup table comprises values to map between a first color space and a second color space; and
provide the lookup table to the printing device.

2. The print calibration system of claim 1, further comprising a measurement device for measuring the plurality of Neugebauer Primary area coverage points.

3. The print calibration system of claim 1, wherein the plurality of Neugebauer Primary area coverage points are calculated.

4. The print calibration system of claim 1, wherein the hue angle represents an angle which maximizes at least one of a chromatic response, and a gamut of an output.

5. The print calibration system of claim 1, wherein values in the lookup table represent a ratio of Neugebauer Primary area coverage points required to produce each of the plurality of nodes.

6. The print calibration system of claim 1, wherein the hue angle represents an ink color.

7. The print calibration system of claim 1, wherein the first node is a minimal node representative of a substantially white output.

8. The print calibration system of claim 1, wherein the second node is a maximal node representative of a node with a largest chromatic response.

9. The print calibration system of claim 1, wherein the plurality of nodes are uniformly distributed.

10. The print calibration system of claim 1, wherein the relationship between the plurality of nodes and the plurality of Neugebauer Primary area coverage points comprises:
determining a Delaunay triangulation of each of the plurality of Neugebauer Primary area coverage points in the color space, forming a plurality of tetrahedrons; and
calculating barycentric coordinates for each of the plurality of nodes based on the position of the node with respect to one of the plurality of tetrahedrons.

11. The print calibration system of claim 10, wherein the barycentric coordinates represent ratios of each Neugebauer Primary area coverage point required to produce an output representation of each node.

12. A method comprising:
receiving data of a plurality of reference values representing a printed output of a printer;
determining a plurality of Neugebauer Primary area coverage points having an initial set of Neugebauer Primaries based on the plurality of reference values;
deriving a hue angle and a color space based on the plurality of Neugebauer Primary area coverage points;
generating a sectional representation of an intersection between a convex hull of the plurality of Neugebauer Primary area coverage points in the color space and a plane extending across the color space at the hue angle;
determining a plurality of nodes distributed between a first node and a second node of the sectional representation for reproducing a color ramp;
generating a lookup table based on a relationship between the plurality of nodes and the plurality of Neugebauer Primary area coverage points; and
providing the lookup table to the printer for use in printing.

13. A non-transitory computer-readable storage medium comprising a set of computer-readable instructions that, when executed by a processor of a printing system cause the processor to:
cause a plurality of calibration points for reproducing a color ramp to be printed by the printing system;
receive a plurality of Neugebauer Primary area coverage points having an initial set of Neugebauer Primaries based on the calibration points;
determine a hue angle and color space based on the plurality of Neugebauer Primary area coverage points;
generate a sectional representation of a juncture between a convex hull of the plurality of Neugebauer Primary area coverage points and a plane extending across the color space at the hue angle;
determine a plurality of points distributed between a first point and a second point of the sectional representation;
generate a plurality of values for an output table based on a relationship between the plurality of points and the plurality of Neugebauer Primary area coverage points for printing on a substrate; and
provide the output table to the printing system for use in printing.

* * * * *